(12) United States Patent
Ito et al.

(10) Patent No.: US 7,100,368 B2
(45) Date of Patent: Sep. 5, 2006

(54) DRIVE DEVICE FOR A SECONDARY AIR INJECTION SYSTEM

(75) Inventors: Makoto Ito, Okazaki (JP); Akira Ando, Nagoya (JP); Shigeru Takeuchi, Gamagori (JP)

(73) Assignee: Denso Corporation, Kariya (JP)

( * ) Notice: Subject to any disclaimer, the term of this patent is extended or adjusted under 35 U.S.C. 154(b) by 64 days.

(21) Appl. No.: 11/025,153

(22) Filed: Dec. 30, 2004

(65) Prior Publication Data
US 2005/0210866 A1 Sep. 29, 2005

(30) Foreign Application Priority Data
Mar. 25, 2004 (JP) .............................. 2004-089196
Jul. 21, 2004 (JP) .............................. 2004-212928

(51) Int. Cl.
*F01N 3/00* (2006.01)
(52) U.S. Cl. ............................ 60/287; 60/277; 60/289; 60/290
(58) Field of Classification Search .................. 60/277, 60/287, 289, 290
See application file for complete search history.

(56) References Cited
U.S. PATENT DOCUMENTS 5,852,929 A * 12/1998 Kato et al. ..................... 60/274
6,658,841 B1 * 12/2003 Beer et al. ..................... 60/286
6,898,927 B1 * 5/2005 Morinaga et al. .............. 60/284
6,945,035 B1 * 9/2005 Hirooka et al. ................ 60/289
6,978,203 B1 * 12/2005 Yasui et al. ................... 701/101
2003/0070423 A1 4/2003 Morinaga et al.
2003/0101716 A1 6/2003 Hirooka et al.

FOREIGN PATENT DOCUMENTS

JP 7-11939 1/1995

* cited by examiner

*Primary Examiner*—Thomas Denion
*Assistant Examiner*—Loren Edwards
(74) *Attorney, Agent, or Firm*—Nixon & Vanderhye P.C.

(57) ABSTRACT

In a secondary air injection system, MOSFETs control supply of electric current to an air pump and to a motor for driving an electromagnetic valve and to an electromagnetic coil to introduce secondary air into an exhaust gas passage upstream of a catalyst for purifying the exhaust gas of an internal combustion engine. Gate drive circuits control the MOSFETs based on an instruction from an ECU via input signal processing circuits. Abnormal conditions in the operation for controlling the air pump and the electromagnetic valve are detected, and, when an abnormal condition is detected, forcibly turn the MOSFETs off to interrupt the current to the motor and to the electromagnetic coil. A diagnosing circuit sends to the ECU diagnosis signals representing the state of controlling the load.

22 Claims, 6 Drawing Sheets

DRIVE DEVICE FOR A SECONDARY AIR INJECTION SYSTEM

CROSS REFERENCE TO RELATED APPLICATIONS

This application is based upon, claims the benefit of priority of, and incorporates by reference the contents of, Japanese Patent Application No. 2004-89196 filed on Mar. 25, 2004 and Japanese Patent Application No. 2004-212928 filed on Jul. 21, 2004.

FIELD OF THE INVENTION

The present invention relates to a drive device for driving a secondary air injection system to promote the rise of temperature of a catalyst to purify the exhaust gas of an internal combustion engine.

BACKGROUND OF THE INVENTION

An internal combustion engine includes a catalyst disposed in its exhaust gas passage for purifying exhaust gas. However, the catalysts may not be capable of sufficiently purifying the exhaust gas when the temperature in the exhaust gas is not sufficiently high during, for example, the cold start of the internal combustion engine. Therefore, a secondary air injection system has been proposed in which secondary air is introduced into the exhaust gas passage upstream of the catalyst by using a motor-driven air pump and an air switching valve to increase the concentration of oxygen in the exhaust gas and the air-fuel ratio thereof. Accordingly, the system promotes secondary combustion such as of HC and CO in the exhaust gas to thereby purify the exhaust gas and activate the catalyst at an earlier time by raising the temperature of the exhaust gas. This system is disclosed in, for example, JP-A-2003-138929 and JP-A-2003-201834, the contents of which are incorporated herein by reference. In the systems disclosed in these patent documents, an $O_2$ sensor or an exhaust gas sensor is arranged in the exhaust gas passage of an internal combustion engine, and an electronic control unit (ECU) diagnoses an abnormal condition of the system upon receiving output signals from the sensors. In the system disclosed in JP-A-2003-201834, in particular, an output signal from a pressure sensor arranged between an air pump and an air switching valve is sent to the ECU to specify in which of the air pump or the air switching valve the fault has occurred.

For example, if an air pump becomes faulty and an over-current continues to flow into a drive motor thereof, it is probable that the system as a whole may be damaged. Therefore, it becomes necessary to take measures to readily discontinue operation of the drive motor. In the conventional systems, however, it is necessary to operate the entire system inclusive of the ECU for diagnosing abnormal condition. That is, a certain period of time is required until the function for diagnosing the abnormal condition is operated by the ECU, thereby making it difficult to cope with the trouble in a short period of time and causing damage to the system.

Further, the conventional system utilizes the negative pressure on the intake side of the internal combustion engine to operate the air switching valve. Therefore, in a region of a high altitude where the atmospheric pressure is low, the air switching valve may not work to a sufficient degree. Moreover, an electromagnetic valve operatively controlled by the ECU is separately needed for introducing the negative pressure to the air switching valve, thereby resulting in a complex system constitution. An electromagnetic valve instead of the air switching valve may be used to deal with the problem associated with use of the air switching valve, and means may be provided to control the electromagnetic valve together with the air pump relying upon the ECU as taught in, for example, JP-A-7-11939 entitled "Device for Purifying Exhaust Gas of Diesel Engines", the contents of which are also incorporated herein by reference. According to this means, a semiconductor switching element for driving the electromagnetic valve, which is driven by a small current, can be incorporated on the side of the ECU. However, the switching element for driving the air pump requires a capability of permitting a rush current of about 100 to about 200 A. If its heat-radiating structure and the handling of the wire harness inclusive of the connectors are taken into consideration, the semiconductor switching element for driving the air pump must be constructed separately from the ECU. Therefore, there inevitably occur duplicated portions in the power source circuit unit and in the protection circuit unit in their respective drive circuit blocks, thereby leading to higher production costs.

SUMMARY OF THE INVENTION

Accordingly, it is an object to provide a drive device for a secondary air injection system, which is capable of quickly and reliably coping with the occurrence of abnormal conditions in the secondary air injection system to effectively prevent damages to the systems.

According to a first aspect, signal processing means operates first and second semiconductor switching elements upon receiving an instruction signal from a high-order system to thereby control the operation of the motor-type air pump and the electromagnetic valve that constitute the secondary air injection system. In this state, in case an abnormal condition (e.g., fault in the air pump or in the electromagnetic valve, or short-circuit or breakage of line in the load) occurs while the air pump or the electromagnetic valve is in operation, the abnormal condition is detected by abnormal condition detector means. When the abnormal condition is detected, self-protection means executes a predetermined self-protection control operation to quickly and reliably eliminate the abnormal condition that adversely affects the system.

That is, the protection control operation is executed without passing through the ECU that diagnoses the abnormal condition. Therefore, it does not remain in the abnormal condition until the abnormal condition diagnosing function of the ECU starts working unlike that of the conventional art according to which the whole system inclusive of the ECU having the abnormal condition-diagnosing function must be operated. As a result, a countermeasure can be quickly and reliably taken when an abnormal condition occurs in the secondary air injection system, and the damage to the system can be effectively prevented. Further, the diagnosis signals representing the load control state detected by the above signal processing means and the self-protection means are sent to the high-order system from signal output means. By utilizing the diagnosis signals, therefore, the maintenance of the system can be improved.

According to a second aspect, the first and second semiconductor switching elements are incorporated in the same package as the signal processing means and self-protection means. Therefore, the power source circuit and the protection circuit can be shared in the drive circuit blocks for the first and second semiconductor switching elements. As a result, the circuit constitution is simplified and the cost can be decreased.

According to a third aspect, even if the load, i.e., the air pump or the electromagnetic valve, becomes faulty, both the first and second semiconductor switching elements are forcibly turned off and are de-energized, making it possible to quickly and reliably eliminate the possibility of causing an adverse effect upon the secondary air injection system without wastefully continuing the operation of the load.

According to a fourth aspect, if the power supply voltage rises instantaneously and abnormally due to a surge voltage caused by a load dump, it is detected as an abnormal condition by the abnormal condition detector means. Moreover, at least either the first semiconductor switching element or the second semiconductor switching element is forcibly turned on for only a predetermined period of time to pass an electric current to the corresponding load. Therefore, an abnormal rise in the power supply voltage is suppressed depending upon the electric current to thereby prevent irreversible damage to the drive device due to instantaneous and abnormal rise in the power supply voltage. In case an abnormal condition is detected by the abnormal condition detector means, both the first and second semiconductor switching elements may be forcibly turned on for only a predetermined period of time to enhance the effect for suppressing abnormal rise in the power supply voltage.

According to a fifth aspect, when the power supply voltage has abnormally increased or has abnormally decreased, this is detected as an abnormal condition by the abnormal condition detector means, and both the first and second semiconductor switching elements are forcibly turned off for only a predetermined period of time to cause both the air pump and the electromagnetic valve to be de-energized. This prevents abnormal loss of the drive device caused by the operation of the semiconductor switching elements in the active regions stemming from the operation in a state where too great a power supply voltage is continuing or where the power supply voltage is insufficient and, hence, quickly and reliably prevents the possibility of adversely affecting the secondary air injection system.

According to a sixth aspect, if the temperature of the device rises above an upper-limit value, this is detected as an abnormal condition by the abnormal condition detector means, and both the first and second semiconductor switching elements are forcibly turned off for only a predetermined period of time to de-energize both the air pump and the electromagnetic valve. This quickly and reliably prevents irreversible damage to the device due to an abnormal rise in the temperature adversely affecting the secondary air injection system.

According to a seventh aspect, a diagnosis signal sent to the high-order system from the signal output means is a pulse signal having a duty ratio other than 0% or 100%. Therefore, when a fault such as grounding, power source short-circuit or breakage of the signal line connecting to the high-order system occurs, there is no such possibility of an occurrence on the side of the high-order system that a signal (having a duty ratio of 0% or 100%) input accompanying the fault in the signal line is incorrectly recognized as the diagnosis signal. Therefore, the fault is correctly diagnosed based on the diagnosis signal.

According to an eighth aspect, in case two or more abnormal conditions have occurred concurrently, a pulse signal (diagnosis signal) representing the occurrence of an abnormal condition of a relatively high degree of importance is preferentially sent to the high-order system from the signal output means, making it possible to quickly and reliably cope with the abnormal condition of a high degree of importance and minimizing the adverse effect upon the secondary air injection system.

According to a ninth aspect, when a ground line is broken that is connected to a gate drive circuit for the N-channel MOSFET for driving the air pump into which a relatively large load current flows, the electric current which usually flows into the ground line starts flowing into an auxiliary semiconductor switching element, whereby the auxiliary semiconductor switching element is turned on to invalidate the gate signal for the MOSFET, preventing such an occurrence that an excess of load current undesirably continues to flow to damage the secondary air injection system.

According to a tenth aspect, in case a signal input line connecting the high-order system to the signal processing means is grounded, the voltage at the input terminal of the signal processing means drops down to the ground potential level, and there is established a relationship "voltage at the input terminal<threshold voltage" between the input terminal voltage and the threshold voltage generated by the voltage-dividing circuit. Therefore, a short-circuit detection signal is output from the comparator means in the signal processing means. Further, even in case the potential at the ground terminal is elevated due to the breakage of the ground line, there holds the relationship "voltage at the input terminal<threshold voltage". Therefore, the short-circuit detection signal is output from the comparator means. That is, the breakage of the ground wire can be apparently detected as the occurrence of grounding of the input signal line. In this case, signal processing means having a function for detecting the grounding of the signal input line can be utilized for detecting the breakage of the ground wire so that the hardware constitution does not become too complex.

According to an eleventh aspect, in case the input signal line of the signal processing circuit is short-grounded and in case the ground wire is broken, a diagnosis signal having a duty ratio of 0% to 100% is output to the high-order system. On the side of the high-order system, therefore, it becomes possible to correctly determine the grounding of the input signal line and the breakage of the ground wire based on the diagnosis signal.

DESCRIPTION OF THE PREFERRED EMBODIMENTS

First Embodiment

A first embodiment of the invention will now be described with reference to FIGS. 1 to 3.

Figure 2:
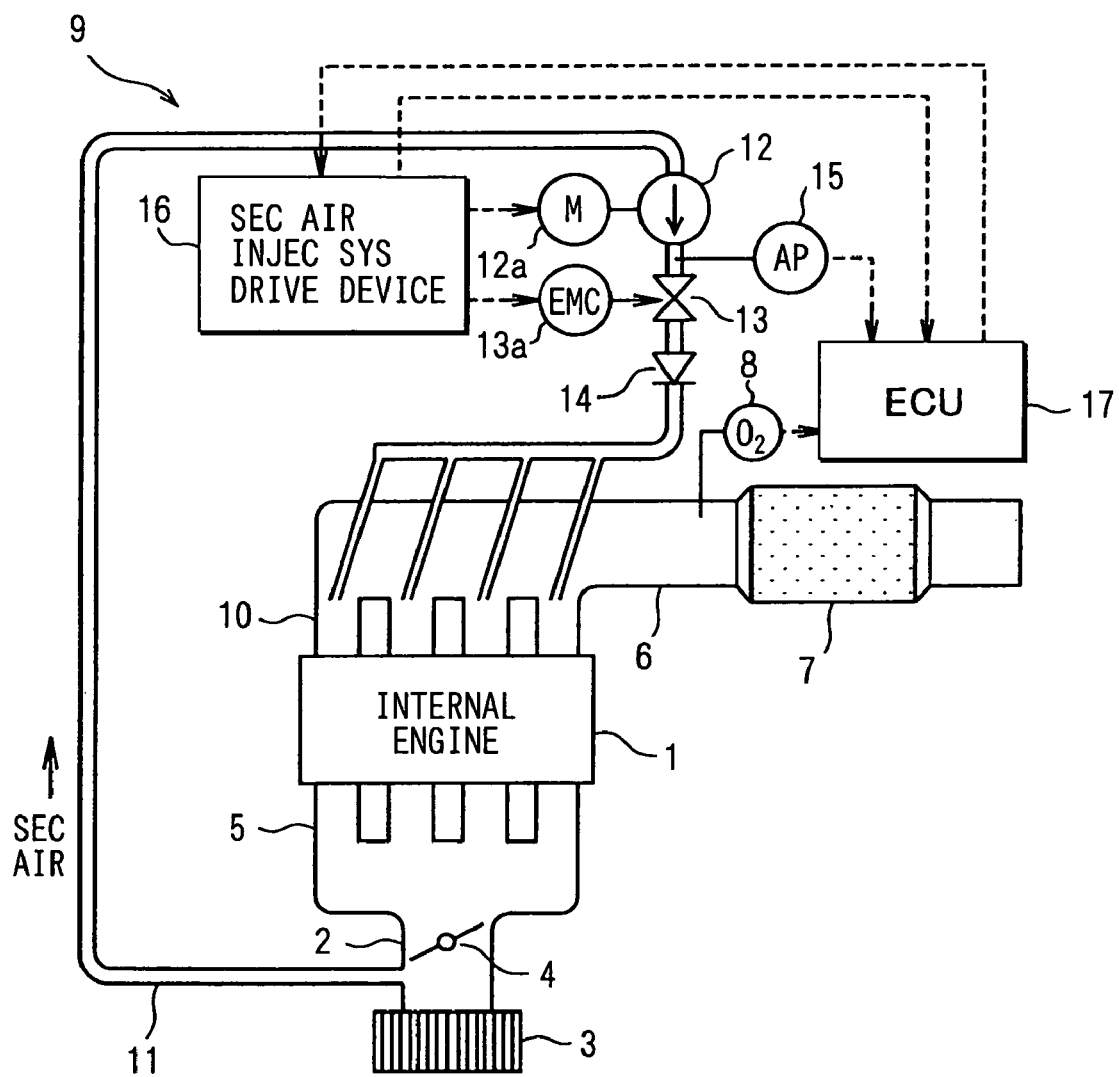
FIG. 2 is a diagram schematically illustrating the constitution of an internal combustion engine inclusive of the secondary air injection system.

FIG. 2 schematically illustrates the secondary air injection system. In FIG. 2, an air filter 3 is provided at the most upstream portion of the intake pipe 2 of a multi-cylinder gasoline engine which is an internal combustion engine (hereinafter abbreviated as an engine), and a throttle valve 4 is provided downstream of the intake pipe 2. Though not shown for ease of illustration, fuel injectors are provided near the intake ports of the intake manifold 5 of the engine 1.

In the exhaust pipe 6 (corresponds to the exhaust gas passage) of the engine 1, a three-way catalyst (hereinafter abbreviated as catalyst) 7 is disposed for purifying the exhaust gas, and an $O_2$ sensor 8 is provided on the upstream side of the catalyst 7 for detecting the concentration of oxygen in the exhaust gas.

A secondary air feeding device 9 has a secondary air feeding pipe 11 for connecting a position on the upstream side of the throttle valve 4 in the intake pipe 2 to a position (particularly, exhaust ports in the exhaust manifold 10) on the upstream side of the $O_2$ sensor 8 in the exhaust pipe 6. The secondary air feeding pipe 11 includes an air pump 12 driven by a motor 12a, an electromagnetic valve 13 driven by an electromagnetic coil 13a and a check valve 14 in this order from the upstream side. Further, a pressure sensor 15 is disposed between the air pump 12 and the electromagnetic valve 13.

A drive device 16 for the secondary air injection system (hereinafter abbreviated as drive device) drives the air pump 12 and the electromagnetic valve 13 based on instruction signals from the engine control ECU 17 (corresponds to a high-order system). The ECU 17 receives detection signals from the $O_2$ sensor 8 and the pressure sensor 15.

Figure 1:
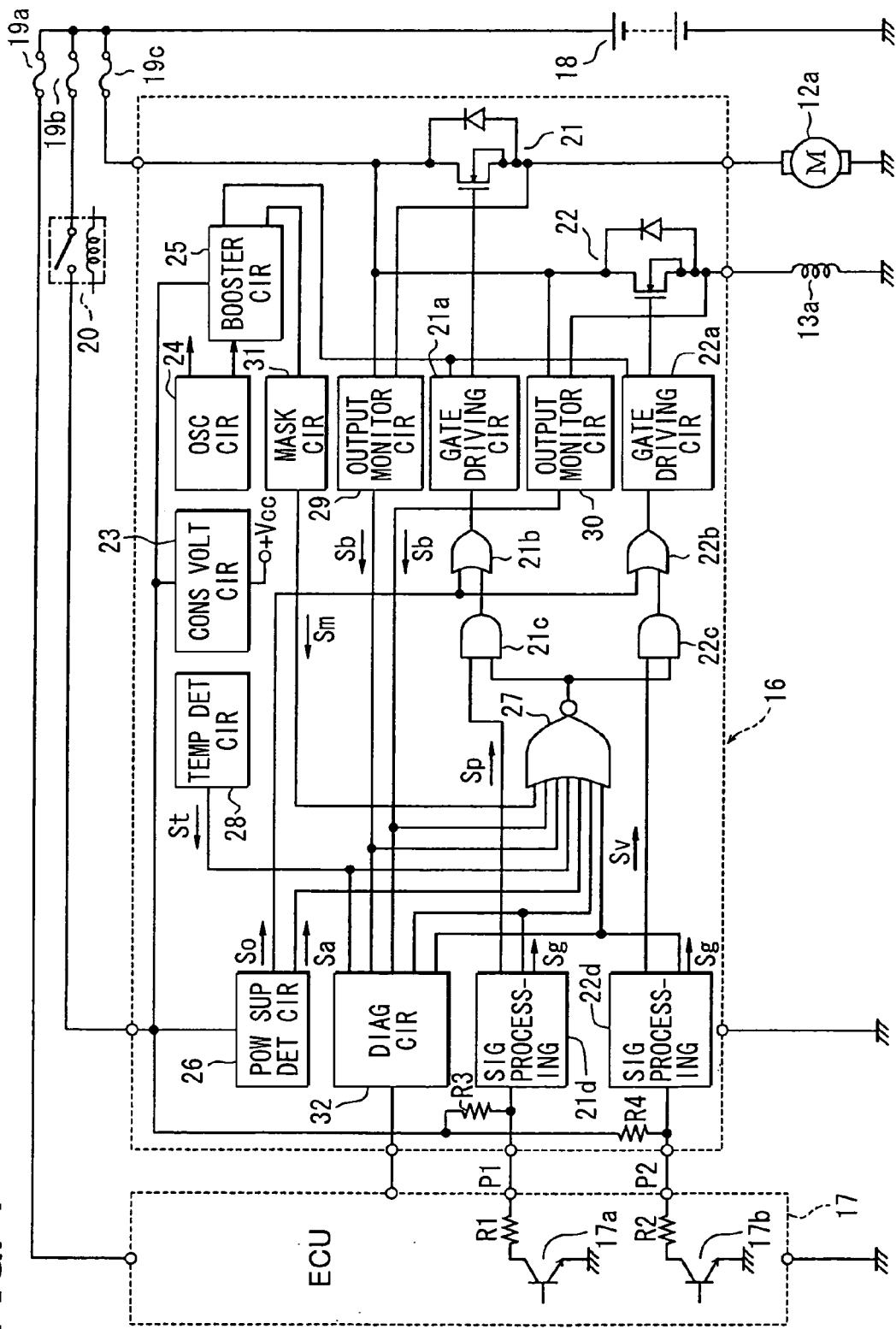
FIG. 1 is a diagram illustrating an electric constitution of a drive device for a secondary air injection system and the peripheries thereof according to a first embodiment.

FIG. 1 illustrates the electric constitution of the above drive device 16 and the peripheries thereof, which will now be described.

Referring to FIG. 1, the ECU 17 receives electric power from a car-mounted battery 18 through a fuse 19a, and the drive device 16 receives electric power from the car-mounted battery 18 through a fuse 19b and a main relay 20 that is turned on and off by an ignition switch that is not shown. Further, the motor 12a which drives the air pump 12 receives electric power from the car-mounted battery 18 though a fuse 19c and an N-channel power MOSFET 21 (corresponds to a first semiconductor switching element) incorporated in the drive device 16, and the electromagnetic coil 13a which drives the electromagnetic valve 13 receives the electric power from the car-mounted battery 18 through the fuse 19c and an N-channel power MOSFET 22 (corresponds to a second semiconductor switching element) incorporated in the drive device 16.

The drive device 16 has a constitution incorporating the above MOSFETs 21 and 22 and the following circuit elements described below in the same package.

That is, a constant-voltage circuit 23 receives electric power through the main relay 20 and applies a constant-voltage to a power source terminal +Vcc for the circuit elements in the drive device 16. An oscillation circuit 24 generates reference clock signals necessary for operating logic circuit portions in the drive device 16 as well as pulse signals necessary for operating a booster circuit 25. The reference clock signals are used as timing signals for determining detection times in detecting an over-current and the breakage of lines.

The booster circuit 25 boosts the power supply voltage (voltage input through the main relay 20) and applies it to gate drive circuits 21a and 22a. The gate drive circuits 21a and 22a generate gate signals of a level corresponding to the output voltage of the booster circuit 25 when the outputs of the OR circuits 21b and 22b provided in the input sides thereof are raised to the level "H", and apply them to the gates of the corresponding MOSFETs 21 and 22.

The OR circuits 21b and 22b are connected to receive an output from a power supply voltage detector circuit 26 (corresponds to abnormal condition detector means) that will be described later through the input terminals on one side thereof, and are connected at the input terminals on the other side to the output terminals of the corresponding AND circuits 21c and 22c. The AND circuits 21c and 22c are connected at the input terminals on the one side to the output terminal of a NOR circuit 27, and receive control signals Sp and Sv from the corresponding input signal processing circuits 21d and 22d (correspond to signal processing means) through the input terminals on the other side.

The control signals Sp and Sv are binary signals of "H" and "L". The input signal processing circuits 21d and 22d produce control signals Sp and Sv at the level "L" when the input voltage thereto is at the level of the power supply voltage, and produce control signals Sp and Sv at the level "H" when the input voltage thereto is at an intermediate voltage level between the power supply voltage and the ground potential.

Here, the ECU 17 selectively produces from its output terminal P1 a drive instruction signal and a stop instruction signal for the air pump 12, and sends them to the input signal processing circuit 21d and, further, selectively produces from its output terminal P2 a drive instruction signal and a stop instruction signal for the electromagnetic valve 13, and sends them to the input signal processing circuit 22d.

In this case, the drive instruction signals are produced when the npn transistors 17a and 17b provided in the output stage of ECU 17 are turned on, and the stop instruction signals are produced when the transistors 17a and 17b are turned off. Concretely speaking, voltage-dividing resistors R1 and R2 are provided between the collectors of transistors 17a, 17b and the output terminals P1, P2, and pull-up resistors R3 and R4 connected to the power source are provided on the side of the input terminals of the input signal processing circuits 21d and 22d. As a result, drive instruction signals of the intermediate voltage level (voltage level obtained by dividing the power supply voltage) are produced from the output terminals P1 and P2 during the on period of the transistors 17a and 17b, and stop instruction signals of the power supply voltage level are produced from the output terminals P1 and P2 during the off period of the transistors 17a and 17b.

Therefore, the input signal processing circuit 21d produces a control signal Sp at the level "H" when it has received the drive instruction signal (intermediate voltage level) from the output terminal P1 of the ECU 17, and produces a control signal Sp at the level "L" when it has received the stop instruction signal (power supply voltage level) from the output terminal P1. Further, the input signal processing circuit 22d produces a control signal Sv at the level "H" when it has received the drive instruction signal from the output terminal P1 of the ECU 17, and produces a control signal Sv at the level "L" when it has received the stop instruction signal from the output terminal P2.

Therefore, in a state where the signal at the level "H" is produced from the NOR circuit 27 (this is a steady state where no abnormal condition or fault such as grounding of the input signal line connected to the ECU 17, insufficient power supply voltage, abnormal rise of temperature, short-circuiting of load or open-circuited load in the drive device 16 is occurring as will be understood from the description appearing later), the control signals Sp and Sv from the input signal processing circuits 21*d* and 22*d* are allowed to pass through the AND circuits 21*c* and 22*c*.

Therefore, the gate drive circuit 21*a* produces a gate signal to turn the MOSFET 21 on when the control signal Sp is at the level "H", and no longer produces a gate signal to turn the MOSFET 21 off when the control signal Sp is at the level "L" to energize/de-energize the motor 12*a* depending upon the instructions (drive instruction signal and stop instruction signal) from the ECU 17. The gate drive circuit 22*a* produces a gate signal to turn the MOSFET 22 on when the control signal Sv is at the level "H", and no longer produces a gate signal to turn the MOSFET 22 off when the control signal Sv is at the level "L" to energize/de-energize the electromagnetic coil 13*a* depending upon the instructions from the ECU 17.

Here, when the input signal line connecting the output terminal P1 of the ECU 17 to the input signal processing circuit 21*d* on the side of the drive device 16 is short-circuited to, for example, the chassis, the input voltage of the input signal processing circuit 21*d* drops down to ground potential. In this case, the input signal processing circuit 21*d* gives a short-circuit detection signal Sg at the level "H" to the input terminal of the NOR circuit 27. Further, in case the input signal line connecting the output terminal P2 of the ECU 17 to the input signal processing circuit 22*d* on the side of the drive device 16 is short-circuited to, for example, the chassis, the input voltage of the input signal processing circuit 22*d* drops down to ground potential. In this case, the input signal processing circuit 22*d* gives a short-circuit detection signal Sg at the level "H" to the input terminal of the NOR circuit 27.

Therefore, in case the signal lines are grounded, the output of the NOR circuit 27 is inverted into the level "L" due to the short-circuit detection signal Sg that is produced as described above, whereby the outputs of the AND circuits 21*c* and 22*c* are forcibly inverted into the "L" level. As a result, no gate signal is output from the gate drive circuits 21*a* and 22*a*, and the MOSFETs 21 and 22 are both forcibly turned off, thereby interrupting the flow of current to the motor 12*a* or to the electromagnetic coil 13*a*.

The power supply voltage detector circuit 26 is provided for detecting abnormal power supply voltage in the drive device 16 based upon a first threshold value Vth1 for detecting a surge voltage due to the load dumping, a second threshold value Vth2 for detecting an over-voltage at the jump start, and a third threshold value Vth3 for detecting an abnormally low voltage (Vth1>Vth2>Vth3).

In this case, the power supply voltage detector circuit 26 produces an over-voltage detection signal So at the level "H" for the OR circuits 21*b* and 22*b* when an instantaneously and abnormally elevated power supply voltage due to a surge voltage stemming from the load dumping is detected relying upon the first threshold value Vth1. Therefore, in case the power supply voltage is instantaneously and abnormally elevated, the outputs of the OR circuits 21*b* and 22*b* are elevated to the level "H" in response to the over-voltage detection signal So. Accordingly, the MOSFETs 21 and 22 are forcibly turned on due to the gate signals from the gate drive circuits 21*a* and 22*a*, whereby a current is supplied to the motor 12*a* and to the electromagnetic coil 13*a* which are the loads to suppress an abnormal rise in the power supply voltage. The state where the MOSFETs 21 and 22 are forcibly turned on continues for only a period of time until the over-voltage detection signal So is extinguished.

Further, the power supply voltage detector circuit 26 gives an abnormal voltage detection signal Sa at the level "H" to the input terminal of the NOR circuit 27 in case an over-voltage at the jump start is detected based on the second threshold value Vth2 or in case an abnormally low power supply voltage is detected based on Vth3. In case an over-voltage is applied accompanying the jump start or in case the power supply voltage has abnormally dropped, therefore, the output of the NOR circuit 27 is inverted into the level "L" due to the abnormal voltage detection signal Sa. Therefore, no gate signal is produced from the gate drive circuits 21*a* and 22*a*, and the electric current is forcibly interrupted from being supplied to the motor 12*a* or to the electromagnetic coil 13*a*.

The temperature detector circuit 28 (corresponds to abnormal condition detector means) is provided to detect the temperature of the substrate that constitutes the drive device 16, and gives an abnormal heat generation detection signal St at the level "H" to the input terminal of the NOR circuit 27 when the detected temperature has exceeded a preset upper-limit temperature. Therefore, in case the temperature of the drive device 16 is abnormally elevated, the output of the NOR circuit 27 is inverted into the "L" level due to the abnormal heat generation detection signal St. Hence, no gate signal is produced from the gate drive circuits 21*a* and 22*a*, and the electric current is forcibly interrupted from being supplied to the motor 12*a* or to the electromagnetic coil 13*a*.

The output monitoring circuits 29 and 30 (correspond to abnormal condition detector means) are for detecting between-source-and-drain voltages of the corresponding MOSFET 21 and 22, and work to detect such faults as short-circuiting of the load (over-current) and open-circuited load based upon the detection time formed by the detected voltage and by the reference clock signals from the oscillation circuit 24, and give a fault detection signal Sb at the level "H" to the input terminal of the NOR circuit 27 when a fault is detected. Therefore, in case the motor 12*a* and the electromagnetic coil 13*a* which are the loads become faulty such as short-circuited or breakage of the line, the output of the NOR circuit 27 is inverted into the level "L" due to the fault detection signal Sb. Hence, no gate signal is produced from the gate drive circuits 21*a* and 22*a*, and the electric current is forcibly interrupted from being supplied to the motor 12*a* or to the electromagnetic coil 13*a*.

Here, the self-protection means referred to in this invention is constituted by a combination of the OR circuits 21*b*, 22*b*, AND circuits 21*c*, 22*c* and NOR circuit 27.

A masking circuit 31, on the other hand, generates a masking signal Sm at the level "H" for only a period of time until the output voltage of the booster circuit 25 is stabilized after the power source circuit of the drive device 16 is closed, the masking signal Sm being applied to the input terminal of the NOR circuit 27. During the period until the output voltage of the booster circuit 25 is stabilized, no gate signal is produced from the gate drive circuits 21*a* and 22*a* to prevent the MOSFETs 21 and 22 from operating unstably.

A diagnosing circuit 32 (corresponds to signal output means) is for producing a diagnosis signal concerned to the drive device 16 to the ECU 17. The diagnosing circuit 32 receives short-circuit detection signals Sg from the input signal processing circuits 21*d*, 22*d*, an abnormal heat generation detection signal St from the temperature detection circuit 28, and fault detection signals Sb from the output monitoring circuits 29, 30.

Figure 3:
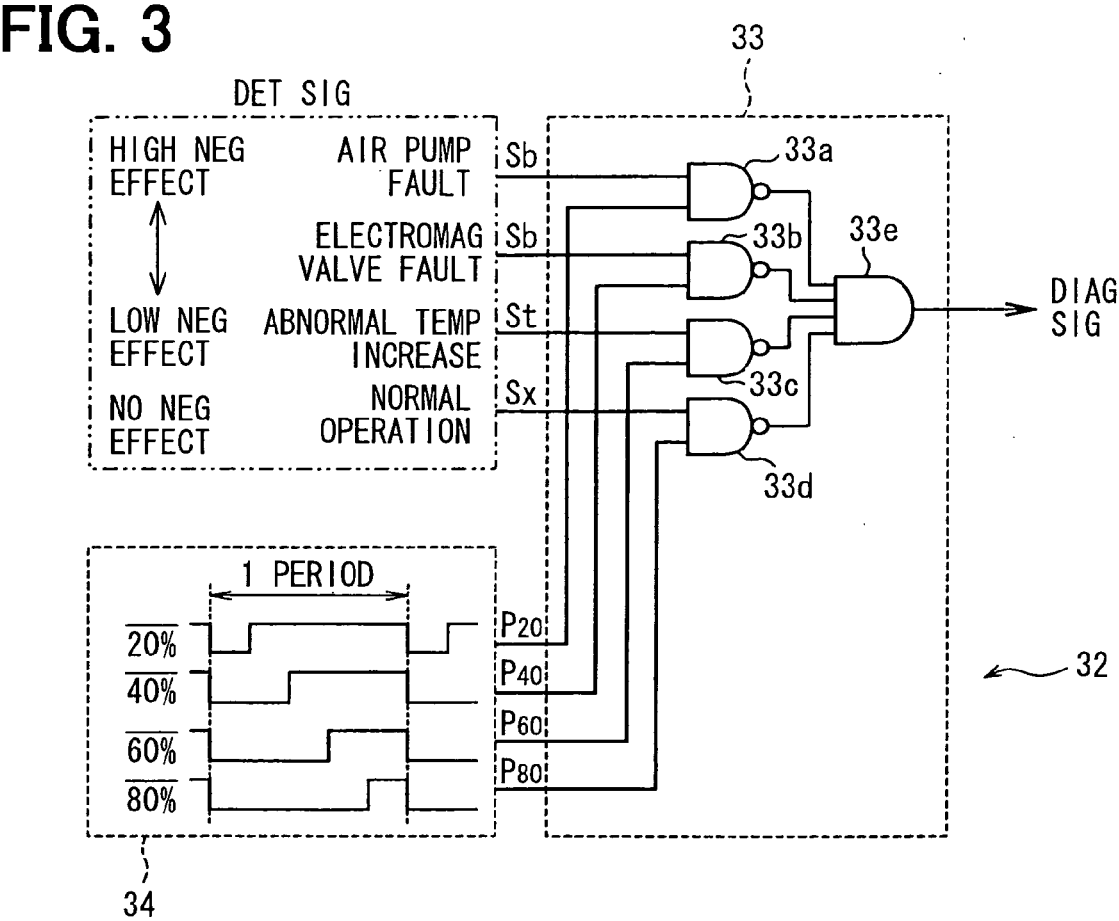
FIG. 3 is a diagram illustrating the constitution of a diagnosis circuit.

FIG. 3 schematically illustrates a constitution of the diagnosing circuit 32. In FIG. 3, the diagnosing circuit 32 is constituted by a diagnosis selection circuit 33 formed by logic circuits, and a pulse signal generating circuit 34 for generating pulse signals of different duty ratios.

The diagnosis selection circuit 33 is constituted by four NAND circuits 33a to 33d, and an AND circuit 33e that receives outputs from the NAND circuits 33a to 33d. The pulse signal generating circuit 34 generates pulse signals $P_{20}$, $P_{40}$, $P_{60}$, $P_{80}$ of which the duty ratios are set to be 20%, 40%, 60% and 80% during the period at the level "L". The pulse signals $P_{20}$, $P_{40}$, $P_{60}$, $P_{80}$ are given to the input terminals on one side of the NAND circuits 33a to 33d in the diagnosis selection circuit 33.

In this case, the detection signals fed to the diagnosing circuit 32 from the temperature detecting circuit 28 and the output monitoring circuits 29, 30 are sorted depending upon the intensity of adverse effect upon the system. That is, a fault detection signal Sb (fault detection signal of the air pump 12) from the output monitoring circuit 29 is regarded to most adversely affect the system, and is input to the input terminal on one side of the NAND circuit 33a in the diagnosis selection circuit 33. A fault detection signal Sb (fault detection signal of the electromagnetic valve 13) from the output monitoring circuit 30 is regarded as having the next most adverse affect on the system, an is input to the input terminal on one side of the NAND circuit 33b in the diagnosis selection circuit 33. The abnormal heat generation detection signal St (abnormal temperature detection signal of the drive device 16) from the temperature detecting circuit 28 is regarded as having less adverse affect on the system relatively, and is input to the input terminal on one side of the NAND circuit 33c in the diagnosis selection circuit 33.

The outputs from the input signal processing circuits 21d and 22d are fed to the input terminals of the NOR circuit that is not shown, and a signal at the level "H" output from the NOR circuit is input to the input terminal on one side of the NAND circuit 33d in the diagnosis selection circuit 33 as a normal operation signal Sx representing that the system is not being adversely affected. The NOR circuit that is not shown produces the above normal operation signal Sx in a state where no short-circuit detection signal Sg (signal at the level "H") is produced from the input signal processing circuits 21d and 22d.

Therefore, the thus constituted diagnosing circuit 32 operates in a manner as described below. That is, when a fault detection signal Sb is produced from the output monitoring circuit 29 accompanying the occurrence of a fault in the air pump 12, the AND circuit 33e in the diagnosis selection circuit 33 produces a pulse signal (signal of a state obtained by inverting the pulse signal $P_{20}$) having a duty ratio of 20%. When a fault detection signal Sb is produced from the output monitoring circuit 30 accompanying the occurrence of a fault in the electromagnetic valve 13, the AND circuit 33e produces a pulse (signal of a state obtained by inverting the pulse signal $P_{40}$) having a duty ratio of 40%. When the temperature detecting circuit 28 produces an abnormal heat generation detection signal St accompanying an abnormal rise in the temperature in the drive device 16, the AND circuit 33e produces a pulse (signal of a state obtained by inverting the pulse signal $P_{60}$) having a duty ratio of 60%.

In a state where the input signal processing circuits 21d and 22d are normally operating, i.e., in a state where a short-circuit detection signal Sg is produced from neither the input signal processing circuit 21d nor the input signal processing circuit 22d and a drive instruction signal is input to the two input signal processing circuits from the ECU 17, a normal operation signal Sx at the level "H" is given to the input terminal of one side of the NAND circuit 33d. As a result, the AND circuit 33e produces a pulse (signal of a state obtained by inverting the pulse signal $P_{80}$) having a duty ratio of 80%.

Since the AND circuit 33e exists in the output stage of the diagnosis selection circuit 33, a pulse signal (having a relatively small duty ratio) that adversely affects the system to a large extent is preferentially produced when there are simultaneously input the detection signals from the input signal processing circuits 21d, 22d and from the temperature detecting circuit 28, in addition to the normal operation signal Sx.

As described above, a pulse signal produced from the diagnosis selection circuit 33, i.e., a pulse signal having a small duty ratio adversely affecting the system to a large extent, is given as diagnosis signal to the ECU 17.

The embodiment described above exhibits the effect as described below.

That is, according to the constitution of this embodiment, the motor 12a and the electromagnetic coil 13a which are the loads are forcibly de-energized when any one of a short-circuit detection signal Sg, an abnormal voltage detection signal Sa, an abnormal heat generation detection signal St or a fault detection signal Sb is output from the input signal processing circuits 21d, 22d, power supply voltage detection circuit 26, temperature detection circuit 28 or output monitoring circuits 29, 30, i.e., when the input signal lines connecting the output terminals P1, P2 of the ECU 17 to the drive device 16 are grounded, when an excess of voltage is applied at the jump start, when the power supply voltage has abnormally dropped, when the temperature of the drive apparatus 16 is abnormally elevated, when the motor 12a and the electromagnetic coil 13a are short-circuited or the lines thereof are broken. When an overvoltage detection signal So is produced, i.e., when the power supply voltage is instantaneously elevated due to the load dumping, an electric current is forcibly fed to both the motor 12a and the electromagnetic coil 13a to suppress the power supply voltage from abnormally rising. In case an abnormal condition occurs in the drive device 16, the protection function works quickly and reliably due to the above action minimizing the damage to the system as a whole.

That is, according to this embodiment, the protection control performed without the ECU 17 which is for diagnosing abnormal conditions. Therefore, the abnormal state is not left to stand until the abnormal condition diagnosing function of the ECU 17 works unlike that of the conventional constitution in which the system as a whole must be operated inclusive of the ECU 17 having the abnormal condition diagnosing function. As a result, it is made possible to quickly and reliably cope with the situations in case an abnormal condition has occurred in the secondary air injection system, and the damage to the system can be effectively prevented.

Further, the diagnosing circuit 32 provided in the drive device 16 sends, to the ECU 17 having a diagnosing function, diagnosis signals representing the load control state as detected by the input signal processing circuits 21d, 22d, power supply voltage detecting circuit 26, temperature detecting circuit 28 and output monitoring circuits 29, 30. By using the diagnosis signals, therefore, maintenance of the system can be enhanced. In this case, the diagnosis signals given to the ECU 17 from the diagnosing circuit 32 are regarded to possess duty ratios that decrease with an increase in the degree of adversely affecting the secondary air injection system. As a result, it becomes possible to quickly and reliably detect a fault that is expected to seriously affect the system. By immediately taking a proper procedure on the side of the ECU 17, therefore, adverse effect upon the system can be minimized. Even when the system is normally operating, further, a diagnosis signal (duty ratio of 80%) having the lowest degree of preference has been given to the ECU 17. On the side of the ECU 17, therefore, the normal operation conditions of the air pump 12 and the electromagnetic valve 13 can be detected earlier than a response from the $O_2$ sensor 8, minimizing the adverse effect caused by an abnormal condition in the system.

Besides, the duty ratio of the diagnosis signal varies over a range of 20 to 80%. Therefore, even when a signal of a duty ratio of 100% or 0% is input to the ECU 17 accompanying the occurrence of an abnormal condition (grounding, short-circuit in the power source, breakage of line) in the input signal line connecting the diagnosing circuit 32 to the ECU 17, the above state is not erroneously detected as a fault in the air pump 12 or in the electromagnetic valve 13 or as an abnormal rise in the temperature of the drive device 16. Breakage in the input signal line can be easily detected by, for example, applying a bias voltage to the input signal line from the side of the ECU 17 by utilizing a pull-up resistor or the like, rendering the output end on the side of the diagnosing circuit 32 to be an open collector terminal, and turning the open collector terminal on at all times or periodically.

Further, when two or more abnormal conditions have occurred concurrently, a diagnosis signal (pulse signal having a relatively small duty ratio) representing the occurrence of an abnormal condition of a degree which is relatively important is preferentially sent to the ECU 17 from the diagnosing circuit 32. This makes it possible to quickly and reliably cope with an abnormal condition having a high degree of importance minimizing the adverse effect upon the secondary air injection system.

Second Embodiment

Figure 4:
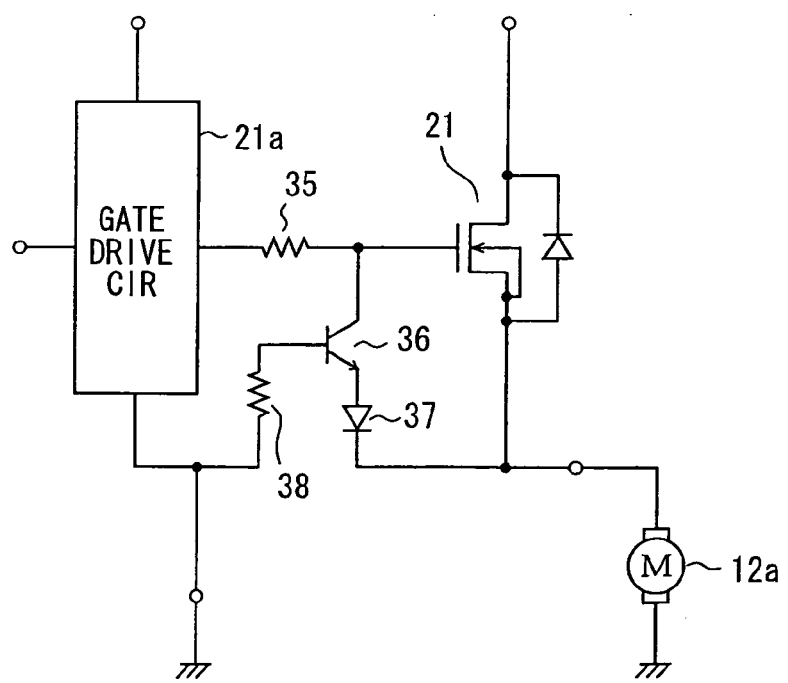
FIG. 4 is a diagram illustrating a circuit constitution of a major portion of the drive device according to a second embodiment.

FIG. 4 illustrates a second embodiment, and described below are only those portions different from those of the above first embodiment. This embodiment corresponds to the ninth aspect.

In FIG. 4, the gate drive circuit 21a is connected between the booster circuit 25 (see FIG. 1) and the grounding terminal, and a gate signal is given to the gate of the MOSFET 21 for driving the motor 12a through a resistor 35. Between the gate and the source of the MOSFET 21, there is connected a series circuit of an npn-type bipolar transistor 36 (corresponds to an auxiliary semiconductor switching element) and a diode 37 of a polarity shown for compensating a breakdown voltage across the collector and emitter and across the base and emitter of the transistor 36. The base of the transistor 36 is connected, via a resistor 38, to a signal line (ground line) connecting the gate drive circuit 21a to the grounding terminal.

According to this constitution, in case the ground line is broken, a base current corresponding to a current consumed by the gate drive circuit 21a flows into the base of the transistor 36 causing the transistor 36 to be turned on. Therefore, even if the gate potential of the MOSFET 21 floats due to the broken line, the gate potential for the MOSFET 21 drops down to the level of ground potential (corresponds to a state where the gate signal for the MOSFET 21 is invalidated). It is, therefore, made possible to reliably prevent such an occurrence that the secondary air injection system is damaged due to a heavy load current that undesirably continues to flow through the MOSFET 21.

Third Embodiment

Figure 5:
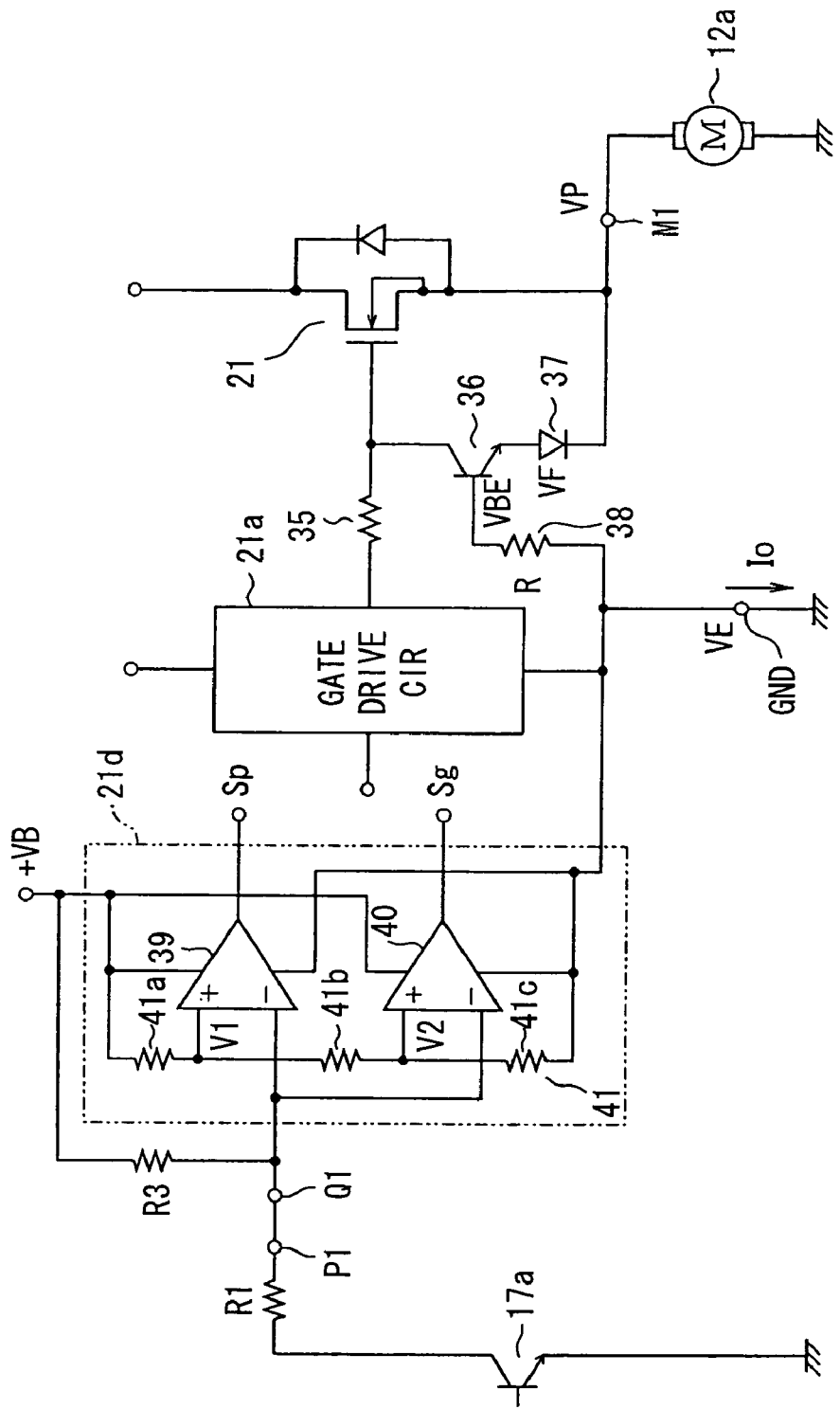
FIG. 5 is a diagram which corresponds to FIG. 4 and illustrates a third embodiment.
Figure 6:
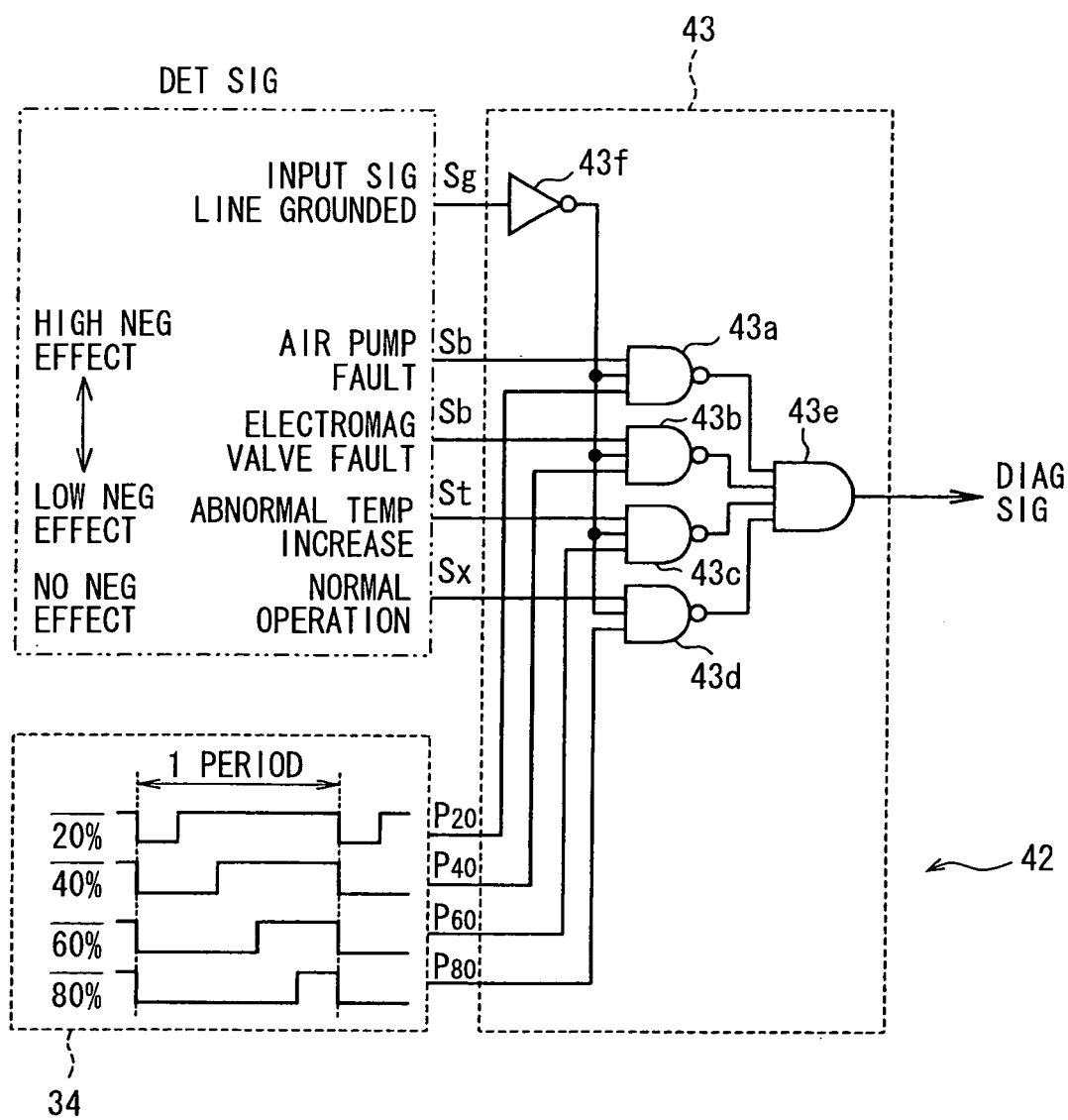
FIG. 6 is a diagram which corresponds to FIG. 3 and illustrates the third embodiment.

FIGS. 5 and 6 illustrate a third embodiment of the invention which is an improvement of the above second embodiment, and described below are only those portions different from those of the above first and second embodiments. This embodiment corresponds to the invention of the tenth and eleventh aspects of the invention.

FIG. 5 illustrates the circuit constitution shown in FIG. 4 to which are further added the concrete circuit constitution of the input signal processing circuit 21d of FIG. 1 and the peripheral circuit on the input side thereof. In FIG. 5, the input signal processing circuit 21d includes two comparators 39 and 40 served with a power supply from the power source terminal $^+$VB and the grounding terminal which are for the drive device for the secondary air injection system 16 (see FIG. 1), and a voltage-dividing circuit 41 constituted by connecting the resistors 41a to 41c in series between the power source terminal $^+$VB and the grounding terminal. The comparator 40 corresponds to the comparator means which is referred to in this invention.

The voltage-dividing circuit 41 produces a first reference voltage V1 and a second reference voltage V2 (V2<V1) which corresponds to the "threshold voltage" referred to in this invention, the first reference voltage V1 being given to a non-inverted input terminal (+) of the comparator 39, and the second reference voltage V2 being given to a non-inverted input terminal (+) of the comparator 40. To the inverted input terminals (−) of the comparators 39 and 40, there are given the outputs from the output terminal P1 of the engine control ECU 17 (see FIG. 1), i.e., there are added a drive instruction signal and a stop instruction signal for the air pump 12 (see FIG. 2).

As described in the first embodiment, the drive instruction signal is a signal of an intermediate voltage level (voltage level obtained by dividing the power supply voltage by the resistors R1 and R3) produced during the on period of the transistor 17a which constitutes the output stage of the ECU 17, and the stop instruction signal is a signal of the power supply voltage level (pull-up potential by the pull-up resistor R3) produced during the off period of the transistor 17a.

In a state where the circuit is normally working, if the voltage level of the drive instruction signal is denoted by VIN and the voltage level of the stop instruction signal by VOUT, the reference voltages V1 and V2 establish the following relationship, $$0<V2<VIN<V1<VOUT$$

In a state where the circuit is normally working, therefore, the comparator 39 produces a control signal Sp at the level "H" when a drive instruction signal is given to the input signal processing circuit 21d from the output terminal P1, and produces a control signal Sp at the level "L" when a stop instruction signal is given thereto from the output terminal P1. Further, in case the input signal line connecting the input terminal Q1 to the output terminal P1 and to the input signal processing circuit 21d is short-circuited to the chassis or the like, the voltage at the input terminal Q1 drops down to the ground potential and, hence, the comparator 40 produces a short-circuit detection signal Sg at the level "H". In the normal state where the input signal line is not short-circuited to the chassis, the output signal from the comparator 40 is held at the level "L".

Here, in case the signal line (ground line) connecting the gate drive circuit 21a to the grounding terminal is broken as described in the above second embodiment, the transistor 36 is turned on, and the gate signal for the MOSFET 21 is invalidated reliably preventing such an occurrence that the secondary air injection system is damaged due to undesired flow of a large load current through the MOSFET 21.

Here, in a state where the protection function is working, i.e., in a state where the transistor 36 is turned on in response to the breakage of the ground line, it is probable that the output monitoring circuit 29 (see FIG. 1) for detecting the source-drain voltage of the MOSFET 21 fails to normally operate (here, as described in the first embodiment, the output monitoring circuit 29 detects the fault such as the short-circuited load or the open-circuited load based on the detected voltage, and produces a fault detection signal Sb at the level "H" in a state where a fault is detected).

That is, in a state where the transistor 36 is turned on due to the breakage of the ground line, the potential VP at the terminal M1 of the motor 12*a* on the power source side (corresponds to the detection terminal of the output monitoring circuit 29) becomes lower than a potential VE at a portion where the ground line is broken, i.e., at the terminal GND shown in FIG. 5. Concretely speaking, if a current consumed by the drive device 16 flowing through the ground line is denoted by lo, a voltage across base and emitter of the transistor 36 by VBE, a drop of forward voltage across the diode 37 by VF, and a resistance of the resistor 38 by R, then, the following relationship holds when the ground line is broken, $$VE = lo \cdot R + VBE + VF + VP$$

and VE>VP. Further, in a state where the transistor 36 is turned on, even if the current lo (e.g., several mA to several tens of mA) consumed by the drive device 16 all flows into a low-impedance load of lower than 1 Ω, such as the motor 12*a*, the potential Vp at the terminal M1 of the motor 12*a* becomes Vp≈0 V and, hence, $$VE \approx lo \cdot R + VBE + VF \quad (1)$$

In this case, when the integrated circuit including the output monitoring circuit 29 is the one having a general constitution produced by the separation of PN junction, it is probable that the output monitor circuit 29 fails to normally operate in case the potential BP at the detection terminal becomes lower than the potential VE at a portion where the ground line is broken as described above. Thus, when the output monitoring circuit 29 fails to normally detect the abnormal condition, no abnormal condition diagnosis signal is output from the drive device 16, and the ECU 17 which is the high-order system becomes no longer capable of detecting abnormal condition.

In this embodiment, therefore, in a state where the ground line is broken causing the potential VE at the broken portion to be elevated as represented by the above formula (1) and, hence, permitting the first reference voltage V1 and the second reference voltage V2 (V2<V1) to be elevated, the value VE is so determined that a relationship, $$VE < VIN < V2 \quad (2)$$

holds. Therefore, in a state where an abnormal condition of breakage of the ground line is occurring, the comparator 40 produces a signal (corresponds to the short-circuit detection signal Sg) of the "H" level when a drive instruction signal (voltage level VIN) is given from the output terminal P1. Therefore, the occurrence of breakage of the ground line can apparently be detected as the occurrence of grounding of the input signal line. In the circuit constitution of FIG. 5, the resistance R of the resistor 38 is determined by taking the level of the current lo consumed by the drive device 16 into consideration to hold the relationship of (2).

When there are a plurality of passages of flow of the consumption current lo in addition to the example of FIG. 5, the currents are squeezed in advance for the passages that do not affect the basic function of the drive device 16 by using, for example, resistors that also work to protect the circuit, such that not less than one-half of the whole consumption current lo flows through the passage (which is through the ground line from the terminal GND) in FIG. 5.

In this embodiment, a diagnosing circuit 42 shown in FIG. 6 is used as signal output means instead of the diagnosing circuit 32 (see FIG. 3) in the first embodiment. The diagnosing circuit 42 includes a diagnosis selection circuit 43 having an internal constitution different from that of the diagnosis selection circuit 33 in the diagnosing circuit 32. Concretely speaking, the diagnosis selection circuit 43 is constituted by four three-input NAND circuits 43*a* to 43*d*, an AND circuit 43*e* that receives outputs from the NAND circuits 43*a* to 43*d*, and a NOT circuit 43*f* (corresponds to function-changing means) that receives a short-circuit detection signal Sg that represents the grounding of the input signal line. In the NAND circuits 43*a* to 43*d*, the first input terminals separately receive a fault detection signal Sb of the air pump 12, a fault detection signal Sb of the electromagnetic valve 13, an abnormal heat generation detection signal St and a normal operation signal Sx, the second input terminals receive the output from the NOT circuit 43, and the third input terminals separately receive pulse signals P20, P40, P60 and P80 from the pulse signal generating circuit 34.

In the diagnosing circuit 42, therefore, the AND circuit 43*e* forcibly produces a diagnosis signal of a duty ratio of 100% taking the precedence over other diagnosis signals when the short-circuit detection signal Sg is given. In this case, the short-circuit detection signal Sg is produced when the input signal line is grounded as well as when the ground line is broken. On the side of the ECU 17, therefore, the abnormal condition is detected in case the input signal line is grounded and the abnormal condition is also detected in case the ground line is broken.

As a result, even if a fault detection signal Sb is incorrectly produced when the output monitoring circuit 29 has failed to normally operate in a state where the potential VP at the detection terminal of the output monitoring circuit 29 (at the terminal M1 of the motor 12*a* on the power source side) becomes lower than the potential VE at a place where the ground line is broken accompanying the breakage of the ground line, there is produced the diagnosis signal (duty ratio of 100%) taking the most precedence to indicate the grounding of the input signal line or the breakage of the ground line. Even in case the output monitoring circuit 29 fails to normally operate, therefore, the abnormal condition is reliably detected on the side of the ECU 17 which is the high-order system. Further, since the input signal processing circuit 21*d* equipped with a function for detecting the grounding of the signal input line is utilized for detecting the breakage of the ground line, the hardware constitution is prevented from becoming complex.

Fourth Embodiment

Figure 7:
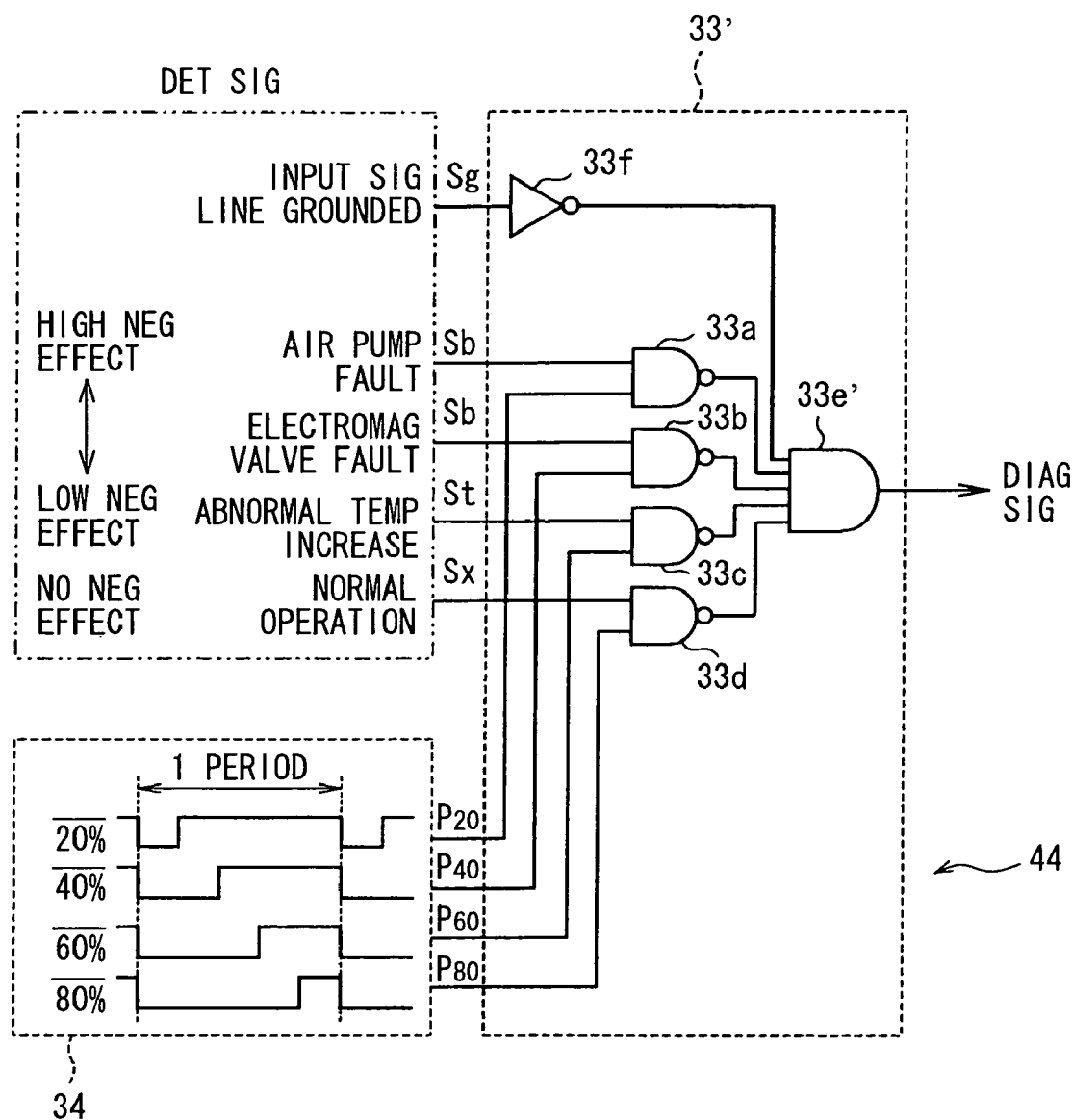
FIG. 7 is a diagram which corresponds to FIG. 3 and illustrates a fourth embodiment.

FIG. 7 illustrates a fourth embodiment of the invention which is modified from the above third embodiment. This embodiment will now be described.

FIG. 7 corresponds to FIG. 6 and illustrates the fourth embodiment which is provided with a diagnosing circuit 44 instead of the diagnosing circuit 42. The diagnosing circuit 44 includes a diagnosis selection circuit 33' which is basically constituted in the same manner as the diagnosis selection circuit 33 in the diagnosing circuit 32 (see FIG. 3) in the first embodiment. Concretely speaking, the diagnosis selection circuit 33' is constituted by four NAND circuits 33*a* to 33*d*, a NOT circuit 33*f* (corresponds to function-changing means) which receives a short-circuit detection signal Sg representing the grounding of the input signal line, and an AND circuit 33*e'* which receives outputs from the NAND circuits 33 to 33*d* and from the NOT circuit 33*f*.

When the diagnosing circuit 44 receives the short-circuit detection signal Sg, therefore, the AND circuit 43*e* forcibly produces a diagnosis signal of a duty ratio of 0% taking the precedence over the other diagnosis signals to exhibit the same effect as that of the above third embodiment.

OTHER EMBODIMENTS

This invention is not limited to the embodiments described above and illustrated in the drawings, but can be further modified or expanded as described below.

In case the power supply voltage instantaneously rises due to the load dumping, the abnormal rise in the power supply voltage is suppressed by forcibly flowing a current to both the motor 12*a* and to the electromagnetic coil 13*a*. In this case, the electric current may be forcibly supplied to at least either the motor 12*a* or the electromagnetic coil 13*a* (or, desirably, to the motor 12*a* having a large load current). Further, the abnormal voltage detection signal Sa from the power supply voltage detection circuit 26 may be applied to the diagnosing circuit 32 and, besides, a diagnosis signal may be output to indicate that the abnormal voltage detection signal Sa is output to the ECU 17 from the diagnosing circuit 32. Further, not being limited to the gate logic circuit constitutions concretely described in the embodiments, any other gate logic circuit constitution may be employed provided an equivalent functional operation is realized. In the embodiments, further, a diagnosis signal having a small duty ratio is preferentially output. When a signal of a large duty ratio is assigned to the abnormal condition having a large degree of importance, however, the diagnosis signal having a large duty ratio may be preferentially output.

The secondary air introduced through the air pump 12 and the electromagnetic valve 13 was fed from the air filter 3 through the secondary air feed pipe 11. However, a dedicated air filter may be provided in a stage preceding the air pump 12, and the air taken in through the air filter may be introduced passing through the air pump 12 and the electromagnetic valve 13.

Therefore, the present disclosure generally concerns a drive device 16 for controlling a load 12*a*, 13*a*, said drive device 17 being disposed within a single chip package, said drive device 16 comprising a semiconductor switching element 21, 22 for controlling the supply of electric current to the load 12*a*, 13*a*; a gate driving circuit 21*d*, 22*d* for operating said semiconductor switching element upon an instruction signal from a high-order system 17; a plurality of abnormal condition detectors 26, 28, 29, 30 for respectively detecting operative states of certain aspects of said drive device and respectively generating operative signals corresponding to the operative states, wherein the operative states include abnormal or normal operation; control logic 27, 21*c*, 22*c*, 21*b*, 22*b* for performing a self-protecting control operation based on the signals received by the plurality of abnormal condition detectors; and a diagnostic circuit 32 for generating a diagnosis pulse signal having a predetermined duty ratio determined based upon a degree of importance of each of the operative states of the certain aspects of the drive device detected by the abnormal condition detector means 26, 28, 29, wherein the diagnosis pulse signal is transmitted to a high-order system 17.

What is claimed is:

1. A drive device for a secondary air injection system including a motor-type air pump and an electromagnetic valve for introducing the secondary air into the exhaust gas passage upstream of a catalyst for purifying the exhaust gas of an internal combustion engine, and first and second semiconductor switching elements for separately controlling the supply of electric current to the air pump and to the electromagnetic valve, said drive device for the secondary air injection system comprising:

signal-processing means for operating said first and second semiconductor switching elements upon receiving an instruction signal from a high-order system;

abnormal condition detector means for detecting abnormal conditions in the operation for controlling the air pump and the electromagnetic valve;

self-protection means for effecting a predetermined self-protecting control operation based on the result detected by the abnormal condition detector means; and signal output means for sending, to the high-order system, a diagnosis signal representing the condition of a load controlled by the signal-processing means and by the self-protection means.

2. A drive device for a secondary air injection system according to claim 1, wherein the signal-processing means, abnormal condition detector means, self-protection means and signal output means are incorporated in the same package together with the first and second semiconductor switching elements.

3. A drive device for a secondary air injection system according to claim 1, wherein the abnormal condition detector means detects the occurrence of a fault in the air pump and in the electromagnetic valve as an abnormal condition, and, when the abnormal condition detector means has detected an abnormal condition in either the air pump or the electromagnetic valve, the self-protection means forcibly turns both the first and second semiconductor switching elements off as self-protection control operation.

4. A device for a secondary air injection system according to claim 1, wherein the abnormal condition detector means detects an instantaneous abnormal increase in the power supply voltage caused by surge voltage as an abnormal condition, and, when the abnormal condition detector means has detected the abnormal condition, the self-protection means forcibly turns at least either the first or second semiconductor switching element on as self-protection control operation.

5. A device for a secondary air injection system according to claim 1, wherein the abnormal condition detector means detects an abnormal increase or an abnormal decrease in the power supply voltage as an abnormal condition, and, when the abnormal condition detector means has detected the abnormal condition, the self-protection means forcibly turns both the first and second semiconductor switching elements off as self-protection control operation.

6. A device for a secondary air injection system according to claim 1, wherein the abnormal condition detector means detects a state where the temperature of the device is elevated in excess of an upper-limit value as an abnormal condition, and, when the abnormal condition detector means has detected the abnormal condition, the self-protection means forcibly turns both the first and second semiconductor switching elements off as self-protection control operation.

7. A device for a secondary air injection system according to claim 1, wherein the signal output means produces, as the diagnosis signal, a pulse signal having a predetermined duty ratio other than 0% or 100%.

8. A device for a secondary air injection system according to claim 7, wherein the abnormal condition detector means detects abnormal conditions of a plurality of forms, and the signal output means sets the duty ratios of pulse signals output as diagnosis signals depending upon the degree of importance of the abnormal condition detected by the abnormal condition detector means, in a manner that a pulse signal corresponding to the abnormal condition having a relatively high degree of importance is preferentially produced in case two or more abnormal conditions are simultaneously detected by the abnormal condition detector means.

9. A device for a secondary air injection system according to claim 1, wherein, between the first and second semiconductor switching elements, at least the first semiconductor switching element for driving the air pump is an N-channel MOSFET connected to the power source side, and provision is made of an auxiliary semiconductor switching element which is turned on when a ground line connected to a gate drive circuit for applying a gate signal to the MOSFET is broken thereby to invalidate the gate signal.

10. A device for a secondary air injection system according to claim 9, further comprising:
 a pull-up resistor for pulling up, to a predetermined pull-up potential, an input terminal voltage of the signal processing means that operates the MOSFET upon receiving an instruction from the high-order system;
 wherein the signal processing means comprises:
 a voltage-dividing circuit for generating a threshold voltage of a level lower than the pull-up potential but is higher than the ground potential by dividing a voltage between the power source terminal and the grounding terminal; and
 a comparator for comparing an input terminal voltage with the threshold voltage and producing a short-circuit detection signal when the input terminal voltage is less than the threshold voltage;
 wherein the level of the threshold voltage generated by the voltage-dividing circuit is set to be higher than the input terminal voltage in a state where the grounding terminal potential is lifted up due to the breakage of the ground line.

11. A device for a secondary air injection system according to claim 10, wherein the signal output means that outputs the diagnosis signal to the high-order system is provided with function-changing means which forcibly produces a diagnosis signal of a duty ratio of 100% or 0% when the short-circuit detection signal is output from the signal processing means.

12. A drive device for a secondary air injection system including a motor-type air pump for introducing the secondary air into the exhaust gas passage upstream of a catalyst for purifying the exhaust gas of an internal combustion engine, and a semiconductor switching element for controlling the supply of electric current to the air pump, said drive device for the secondary air injection system comprising:
 signal-processing means for operating the semiconductor switching element upon receiving an instruction signal from a high-order system;
 abnormal condition detector means for detecting abnormal conditions in the operation for controlling the air pump;
 self-protection means for effecting a predetermined self-protection control operation based on the result detected by the abnormal condition detector means; and
 signal output means for sending, to the high-order system, a diagnosis signal representing the condition of a load controlled by the signal-processing means and by the self-protection means.

13. A device for a secondary air injection system according to claim 12, wherein the abnormal condition detector means detects the occurrence of a fault in the air pump as an abnormal condition, and, when the abnormal condition detector means has detected an abnormal condition in the air pump, the self-protection means forcibly turns the semiconductor switching element off as self-protection control operation.

14. A device for a secondary air injection system according to claim 12, wherein the abnormal condition detector means detects an instantaneous abnormal increase in the power supply voltage caused by surge voltage as an abnormal condition, and, when the abnormal condition detector means has detected the abnormal condition, the self-protection means forcibly turns the semiconductor switching element on as self-protection control operation.

15. A device for a secondary air injection system according to claim 12, wherein the abnormal condition detector means detects an abnormal increase or an abnormal decrease in the power supply voltage as an abnormal condition, and, when the abnormal condition detector means has detected the abnormal condition, the self-protection means forcibly turns the semiconductor switching element off as self-protection control operation.

16. A device for a secondary air injection system according to claim 12, wherein the abnormal condition detector means detects a state where the temperature of the device is elevated in excess of an upper-limit value as an abnormal condition, and, when the abnormal condition detector means has detected the abnormal condition, the self-protection means forcibly turns the semiconductor switching element off as self-protection control operation.

17. A device for a secondary air injection system according to claim 12, wherein the signal output means produces, as the diagnosis signal, a pulse signal having a predetermined duty ratio other than 0% or 100%.

18. A device for a secondary air injection system according to claim 17, wherein the abnormal condition detector means detects abnormal conditions of a plurality of forms, and the signal output means sets the duty ratios of pulse signals output as diagnosis signals depending upon the degree of importance of the abnormal condition detected by the abnormal condition detector means, in a manner that a pulse signal corresponding to the abnormal condition having a relatively high degree of importance is preferentially produced in case two or more abnormal conditions are simultaneously detected by the abnormal condition detector means.

19. A device for a secondary air injection system according to claim 12, wherein the semiconductor switching element is an N-channel MOSFET connected to the power source side, and provision is made of an auxiliary semiconductor switching element which is turned on when a ground line connected to a gate drive circuit for applying a gate signal to the MOSFET is broken thereby to invalidate the gate signal.

20. A device for a secondary air injection system according to claim 19, comprising:

a pull-up resistor for pulling up, to a predetermined pull-up potential, an input terminal voltage of the signal processing means that operates the MOSFET upon receiving an instruction from the high-order system;

wherein the signal processing means comprises:

a voltage-dividing circuit for generating a threshold voltage of a level lower than the pull-up potential but is higher than the ground potential by dividing a voltage between the power source terminal and the grounding terminal; and a comparator for comparing the input terminal voltage with the threshold voltage and produces a short-circuit detection signal when an input terminal voltage is less than the threshold voltage;

wherein the level of the threshold voltage generated by the voltage-dividing circuit is set to be higher than the input terminal voltage in a state where the grounding terminal potential is lifted up due to the breakage of the ground line.

21. A device for a secondary air injection system according to claim 20, wherein the signal output means that outputs the diagnosis signal to the high-order system is provided with function-changing means which forcibly produces a diagnosis signal of a duty ratio of 100% or 0% when the short-circuit detection signal is output from the signal processing means.

22. A drive device for controlling a load, said drive device being disposed within a single chip package, said drive device comprising:

a semiconductor switching element for controlling the supply of electric current to the load;

a gate driving circuit for operating said semiconductor switching element upon an instruction signal from a high-order system;

a plurality of abnormal condition detectors for respectively detecting operative states of certain aspects of said drive device and respectively generating operative signals corresponding to the operative states, wherein the operative states include abnormal or normal operation;

control logic for performing a self-protecting control operation based on the signals received by the plurality of abnormal condition detectors; and a diagnostic circuit for generating a diagnosis pulse signal having a predetermined duty ratio determined based upon a degree of importance of each of the operative states of the certain aspects of the drive device detected by the abnormal condition detectors, wherein the diagnosis pulse signal is transmitted to a high-order system.

* * * * *